R. SCHMITZ.
CLUTCH.
APPLICATION FILED FEB. 7, 1919.
1,344,597.
Patented June 22, 1920.
2 SHEETS—SHEET 2.
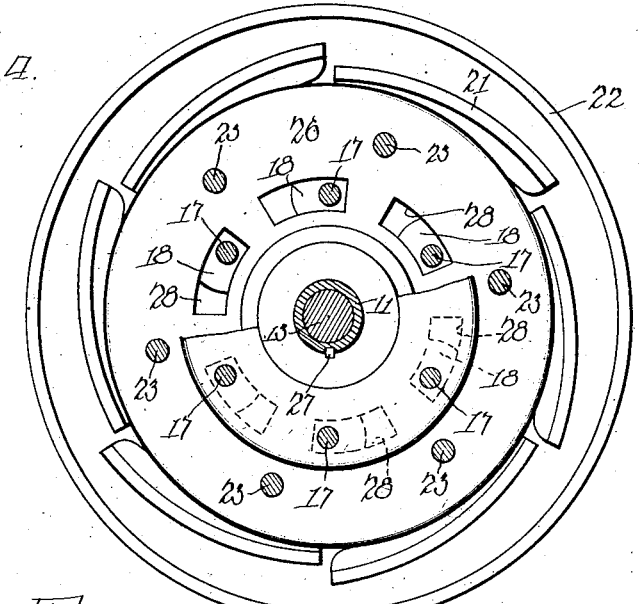
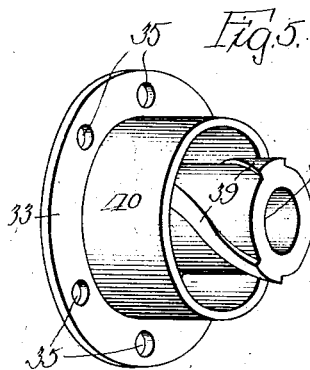
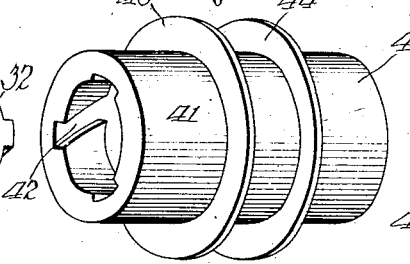
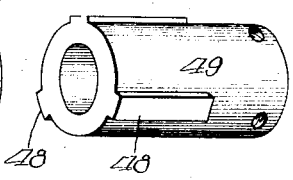
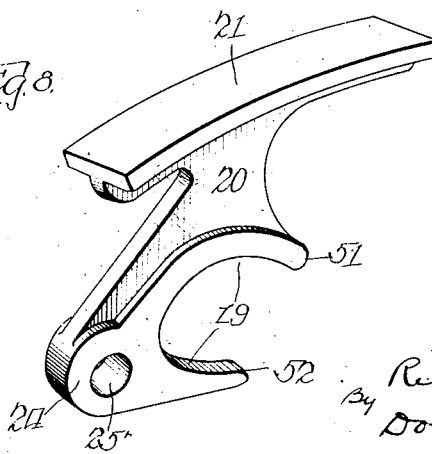
Inventor:
Richard Schmitz
By Dodson & Roe
Attys

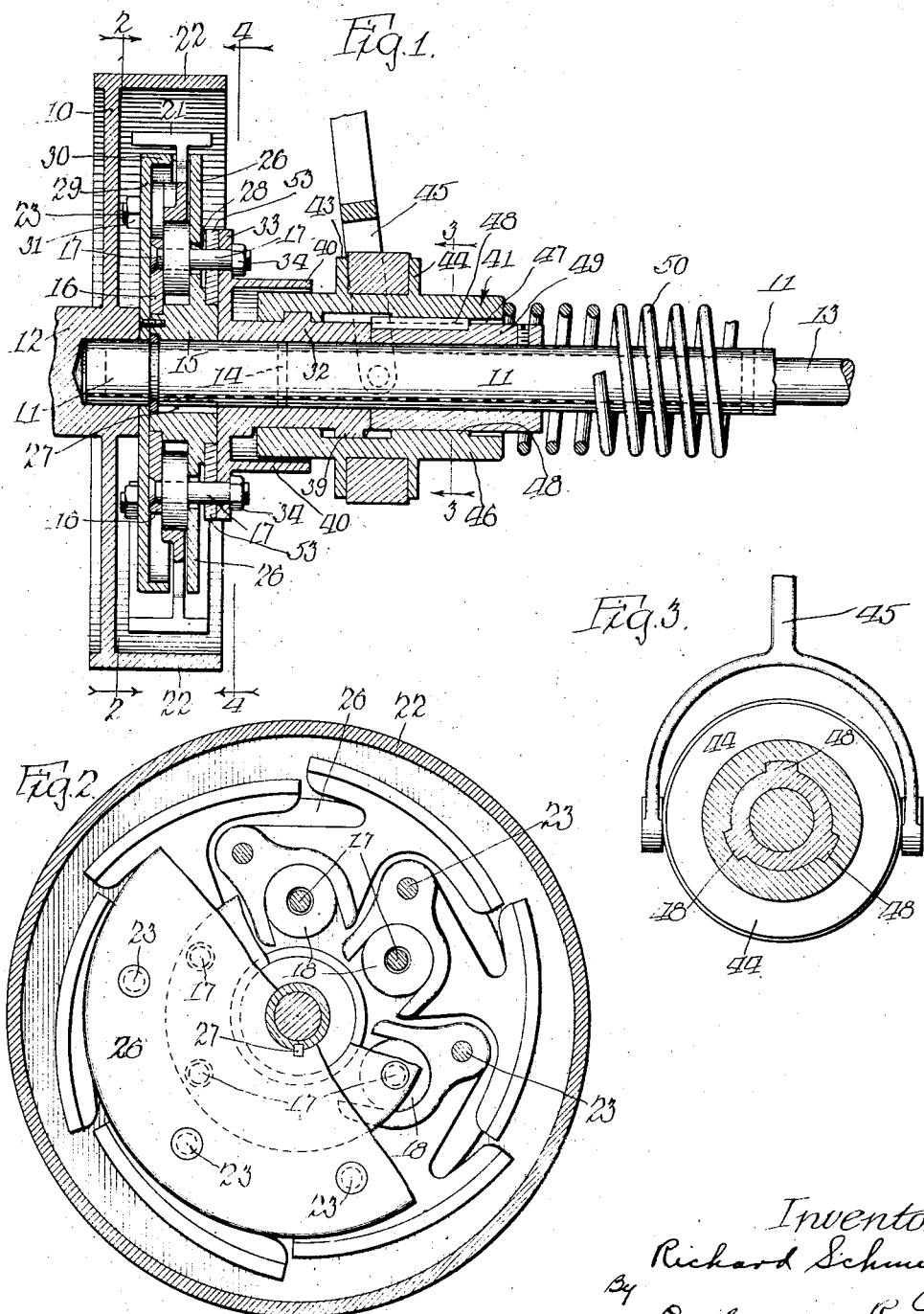

UNITED STATES PATENT OFFICE.

RICHARD SCHMITZ, OF CHICAGO, ILLINOIS.

CLUTCH.

1,344,597.  Specification of Letters Patent.  Patented June 22, 1920.

Application filed February 7, 1919. Serial No. 275,492.

*To all whom it may concern:*

Be it known that I, RICHARD SCHMITZ, a citizen of the United States, residing at Chicago, in the county of Cook and State of Illinois, have invented a certain new and useful Improvement in Clutches, of which the following is the specification.

My invention relates to that class of devices which are designed to effect a point of union between a rapidly rotated mechanism and a stationary shaft or other piece of machinery.

Devices of this kind with which I am familiar are subject to various objections. Cone clutches, for example, require constant attention of the leather facing, and even when given care will sometimes slip, and at other times seize producing an avulsion which produces disastrous effects upon the machinery, or when used in an automobile, upon the occupants of the vehicle. These devices also have to be absolutely in the center to operate correctly and it frequently happens in use that they get off center, with the result they do not effect the proper contact, thus producing unsatisfactory results.

My invention has for its object to produce a clutch which will be to all intents and purposes, self-centering, and has for its further object to produce a clutch in which the rotative action of the mechanism, will tend to prevent its disengagement, thus avoiding the necessity for the use of the extremely heavy spring. For example, it is common experience with persons driving an automobile in crowded traffic that they become very tired as a result of having to hold the clutch out of engagement and consequently compress the heavy spring which is provided to hold it in position.

In my device a comparatively light spring is all that is required and when engaged it is practically impossible for the clutch to slip at the same time when disengaged, it absolutely releases and becomes separate from the clutched member. This is a highly desirable feature because it is not a particularly beneficial action to have the transmission members rotated at engine speed when the car is running idle or as termed, "When the transmission lever is in neutral position," which is the usual condition with clutches of the disk or cone type, whereas with my device, these members will stand absolutely still.

My invention has for its further object to provide a gripping device which will take hold so gradually that it cannot seize.

My means of accomplishing the foregoing objects may be more readily understood by having reference to the accompanying drawings which are hereunto annexed and are a part of this specification, in which:

Figure 1 is a longitudinal sectional view of my improvement, some of the parts being shown in elevation.

Fig. 2 is a section taken on the line 2—2 in Fig. 1 in the direction indicated by the arrows.

Fig. 3 is a section taken on the line 3—3 in Fig. 1 in the direction indicated by the arrows.

Fig. 4 is a section taken on the line 4—4 in Fig. 1 in the direction indicated by the arrows.

Figs. 5 and 6 are isometric perspective views of detailed parts of the invention.

Figs. 7 and 8 are detailed views.

Similar reference numerals refer to similar parts throughout the entire description.

As shown in the drawings, 10 indicates the fly wheel of an engine (not shown). A tube 11 having one end mounted in a recess formed in the hub 12 of the fly wheel 10, the other end of which is slipped over a rod or shaft 13, which, for convenience, will be referred to as the shaft of the transmission. The tube and shaft are secured together by means of a pin 14 shown in dotted lines in Fig. 1. Mounted upon the tube 11 is a hub 15, which is keyed on the tube 11 by a key 27 the said hub being provided with a radially extending flange 26 having slots 28 through which pass a plurality of stud bolts 17. A plate 16 is rotatable on the hub and the bolts 17 are carried by the said plate. Upon these stud bolts are mounted rollers 18 which are preferably hardened and are adapted to engage bearing surfaces 19 which are formed in the friction members 20. The hole in these rollers is larger than the diameter of the stud bolt, thereby permitting a slight eccentric or independent movement which will compensate for any irregularity of the flange 22 of the fly wheel 10. As has been stated, the purpose of mounting the friction engaging members so that they will have eccentric or independent movement with relation to the axis of the hub as well as the surface to be gripped is to permit the gripping members to equalize or compensate for irregular surfaces which the friction members might encounter, and of course this can be accomplished in a number of ways. In a companion application, Serial No. 275,494, a different means is disclosed, but it is believed to be mechanically equivalent to accomplish the result sought and it is my purpose not to limit myself to the specific construction shown in the drawings which are furnished for illustrative purposes only. The exact construction of these friction members is more clearly seen by referring to the detail view Fig. 8. As shown, they consist of an arcuate wearing surface 21, which is adapted to engage the laterally extending circumferential flange 22 of the fly wheel 10. The inner end 24 of the friction engaging device 20, is provided with a bearing 25 which is mounted upon stud bolts 23. These stud bolts are secured in the disk or plate 26. Secured to one end of the hub 15, is a plate 29. The stud bolts 23 extend through the plate 29 which is conveniently attached to the hub 15. This plate 29 may be provided with a laterally extending circumferential flange 30, which serves to exclude dust, dirt, etc., and to retain the lubricant.

The stud bolts 23 are provided with nuts 31 which serve to hold the two plates 26 and 29 in position. A hub 32 is mounted upon the tube 11 and is provided with a radially extending flange 33 which is provided with a plurality of openings 35 through which the stud bolts 17 pass, nuts 34 being provided to hold the flange 33 rigidly in connection with the device as described. An intermediate plate 53 which is provided with a series of perforations, is mounted between the plate 26 and the flange 33.

The construction of this detailed part is more clearly seen by having reference to Fig. 5 which shows the device in perspective. The hub 32 is provided upon its surface with a plurality of spiral threads 39 which are partially covered by an outwardly projecting annular flange 40 which is in spaced relation to the hub 32, and provides room for the insertion of one end of a collar 41, the interior surface of which is provided with slots 42, which are milled to fit the spiral threads 39 on the exterior wall of the hub 32. The collar 41 is provided with two outwardly projecting flanges 43 and 44 which are adapted to receive the rollers of the shifting yoke 45. The opposite end 46 of the collar 41, is provided with a plurality of key slots 47 which are fitted to and coincide with a plurality of feathers or keys 48 formed upon a sleeve 49, which is rigidly mounted upon the tube 11. A coil spring 50 surrounds the tube 11 and exerts a tension upon the outer end of the collar 41.

The operation of the device is as follows: The lever 45 is shifted and through the medium of the flange 43 moves the collar 41 inwardly upon the spiral threads 39 on the hub 32. Inasmuch as the collar 41 is held against rotation by reason of the feathers or keys 48 on the sleeve 49, it necessarily follows that the inward movement of the collar 41 causes the rotation of the hub 32 and through its rotation, the stud bolts 17 are rotated, and these in their rotation, carry with them the rollers which roll upon the bearing surfaces 19, causing them to move outwardly, thus projecting the frictional members 20 outwardly and against the flange 22 of the fly wheel 10. At the same time it will be apparent that this engagement is very gradual and that the frictional surface 21 does not come into full engagement with the flange 22 until the roller has moved out to the end 51 of the bearing surface 19.

Now it will be apparent from the foregoing that the tendency of the rapidly whirling fly wheel will tend to cause the frictional members to stay outward and they cannot move inward unless the hub 32 is rotated in the opposite direction. When this is done, however, it will be apparent that the roller 18 will engage the end 52 of the bearing surface 19 and pull the friction devices inwardly contracting them until the frictional surfaces 21 are completely out of engagement with the flange 22 of the fly wheel 10, when the gripping device will stand still regardless of the speed of the fly wheel. This contracting motion, will, as will be apparent from the foregoing description, be produced by moving the shifting lever 45 in the opposite direction thereby moving the collar 41 away from the hub 32, thus causing it to rotate in the opposite direction and pull the friction devices inwardly.

It will be obvious to persons skilled in the art from the foregoing description that it will be possible to form this device so as to load it with graphite and grease, and the working parts will be thus lubricated for an indefinite period of time.

Having described my invention, what I regard as new and desire to secure by Letters Patent, is:

1. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, and means mounted upon the tube the longitudinal movement of which operates to rotate said annular plate.

2. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate in one direction operates through the rollers to project the friction devices outwardly, and the rotation of said annular plate in the opposite direction retracts said friction device and means mounted upon the tube the longitudinal movement of which operates to rotate said annular plate.

3. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, and means mounted upon the tube the longitudinal movement of which operates to rotate said annular plate, longitudinally movable means mounted on said tube, means actuated thereby which project the friction devices outwardly when the longitudinally movable means are moved in one direction and retract them when moved in the other.

4. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, a flanged hub rotatably mounted on said tube, there being openings in said flange of the rotatable hub through which said roller stud bolts pass, spiral threads on said hub, a sleeve rigidly fastened to said tube, a collar splined to said sleeve having internal spiral threads at its opposite end which are fitted to and coincide with the spiral threads on the hub, and means to shift said collar longitudinally of said tube.

5. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, a flanged hub rotatably mounted on said tube, there being openings in said flange of the rotatable hub through which said roller stud bolts pass, spiral threads on said hub, a sleeve rigidly fastened to said tube, a collar splined to said sleeve having internal spiral threads at its opposite end which are fitted to and coincide with the spiral threads on the hub, means to shift said collar longitudinally of said tube, and plates having laterally extending peripheral flanges mounted at each side of the frictional devices partially inclosing the same.

6. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, a flanged hub rotatably mounted on said tube, through which said roller stud bolts pass and to which they are attached, spiral threads on said hub, a sleeve rigidly fastened to said tube, a collar splined to said sleeve having internal spiral threads at its opposite end which are fitted to and coincide with the spiral threads on the hub, means to shift said collar longitudinally of said tube, and which protect the mechanism from dust and dirt, and means for holding the last mentioned means in stationary relation to the mechanism.

7. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said friction devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers having apertures larger than the stud bolts mounted on said bolts adapted to engage the roller bearing surfaces on the friction devices whereby the rotation of said annular plate operates through the rollers to project the friction devices outwardly, and means mounted upon the tube the longitudinal movement of which operates to rotate said annular plate.

8. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers having apertures larger than the stud bolts mounted on said bolts adapted to engage the roller bearing surfaces on the friction devices whereby the rotation of said annular plate operates through the rollers to project the friction devices outwardly, means mounted upon the tube the longitudinal movement of which operates to rotate said annular plate, there being a plurality of slots in said radially extending flange of greater width than the diameter of the stud bolts through which the stud bolts carrying the rollers pass.

9. The combination with a member to be gripped, a shaft, a hub fixed thereon having a radially extending flange, a plurality of frictional devices having surfaces adapted to engage said member and mounted for movement toward and away from said member, rotatable means loosely mounted for eccentric movement engaging portions of the frictional devices to move said frictional devices outwardly and inwardly, and means for carrying the last mentioned means in a curved path with relation to the frictional devices.

10. The combination with a member to be gripped, a shaft, a hub fixed thereon having a radially extending flange, a plurality of frictional devices on said flange having surfaces adapted to engage said member, rotatable means to move said frictional devices outwardly and inwardly, means for mounting the rotatable means loosely and eccentrically, rotatable means for carrying the rotatable means in a curved path, and longitudinally movable means splined on said shaft the movement of which operate to cause said rotatable means to project or retract said frictional devices.

11. The combination with a member to be gripped, a member with relation to which the member to be gripped rotates, frictional devices adapted to engage the member to be gripped, a pivot for each frictional device on which it oscillates, means for supporting the pivots whereby the frictional devices are in operative relation to said member to be gripped, rotatable means for moving the frictional devices with relation to the member to be gripped, members on which the rotatable means are loosely and eccentrically rotatable, and means for moving the last mentioned members in the arc of a circle.

12. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, said frictional devices being provided with arcuate friction engaging surfaces on their outer portions and bifurcated roller bearing surfaces adjacent said stud bolts, an annular plate rotatably mounted upon one end of said hub, said plate having a plurality of laterally projecting stud bolts, a plurality of rollers mounted on said stud bolts adapted to engage the roller bearing surfaces on the friction devices whereby the rotation of said annular plate operates through the rollers to project the friction devices outwardly, means mounted upon the tube the longitudinal movement of which operates to rotate said annular plate, and means whereby said frictional devices may have independent movement.

13. The combination with a member to be gripped, a member with relation to which the member to be gripped rotates, frictional devices adapted to engage the member to be gripped, means for mounting said frictional devices in operative relation to the said member to be gripped, rotatable means engaging and operating the frictional devices, means movable in an arc for carrying said rotatable means about the axis of the member to be gripped, and means for loosely supporting the rotatable means for eccentric movement on the said means movable in an arc.

14. The combination with a wheel to be gripped, of a clutch mechanism comprising a tube, a hub fixedly mounted thereon having a radially extending flange, laterally projecting stud bolts mounted therein, a plurality of frictional devices mounted upon the said stud bolts, one half of which swing in one direction and the other half in the other from the axis of the tube, said frictional devices being provided with arcuate friction engaging surfaces on their outer portions and bifurcated roller bearing surfaces adjacent said stud bolts, an annular plate rotatably mounted upon one end of said hub, stud bolts carried by the annular plate, a plurality of rollers mounted on said stud bolts adapted to engage the roller bearing surfaces on the friction devices whereby the rotation of said annular plate operates through the rollers to project the friction devices outwardly, means mounted upon the tube the longitudinal movement of which operates to rotate said annular plate, means whereby said frictional devices may have independent movement, and means held by said stud bolts which protect the mechanism from dust and dirt.

15. The combination with a member to be gripped, a shaft, a hub fixed thereon having a radially extending flange, a plurality of frictional devices on said flange having surfaces adapted to engage said member, and rotatable means engaging the frictional devices to move said frictional devices outwardly and inwardly, and means for moving the rotatable means about the axis of the hub.

16. The combination with a member to be gripped, a shaft, a hub fixed thereon having a radially extending flange, a plurality of frictional devices on said flange having surfaces adapted to engage said member, rotatable means engaging the frictional devices to move said frictional devices outwardly and inwardly, means on which the rotatable means are carried, and longitudinally movable means splined on said shaft, the movement of which operates to cause said last mentioned means to project or retract said frictional devices.

17. In combination with a member to be gripped, a shaft, a hub fixed thereon having a radially extending flange, a plurality of frictional devices, means for pivotally connecting the frictional devices to the flange, rotatable members having their peripheries engaging the friction members between their pivots and their friction surfaces for moving them toward and away from the member to be gripped, a disk rotatable about the shaft, and means for mounting the rotatable members on the disk whereby the rotatable members are carried around the axis of the shaft.

18. In a clutch, a driving member, a driven member, frictional devices to effect engagement between the two, a member having pivots on each of which a friction device is pivoted, rotatable means which bear against and cause movement of said friction devices toward and away from the driven member, a member movable in an arc about the axis of the driven member, and means carried by the last mentioned member on which the rotatable means are rotatably mounted.

19. In a clutch, a driving member, a driven member, friction members adapted to operate in conjunction with the driven member to bear against the same, rotatable devices engaging the friction members for moving the friction members toward or away from the driven member, and means movable in an arc with respect to the axis of the driving member for rotatably supporting and carrying the said rotatable devices in said arc.

20. In a clutch, a driving member, a driven member, friction members adapted to operate in conjunction with the driven member to bear against the same, rotatable devices engaging the friction members for moving the friction members toward or away from the driven member, means movable in an arc concentric to the axis of the rotated member for rotatably supporting and carrying the said rotatable devices while the said rotatable devices engage the frictional members and carry said frictional members toward or away from the driven member, and means for operating the means movable in the arc.

In testimony whereof I have signed the foregoing specification.

RICHARD SCHMITZ.